G. E. STOKKE.
WHEEL FOR SAWMILL CARRIAGE TRUCKS.
APPLICATION FILED JAN. 6, 1916.
1,183,691. Patented May 16, 1916.
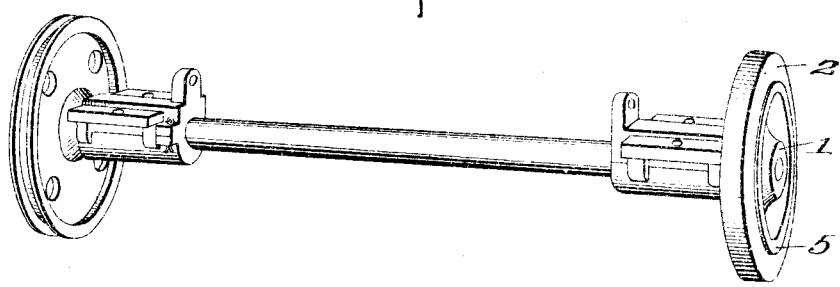
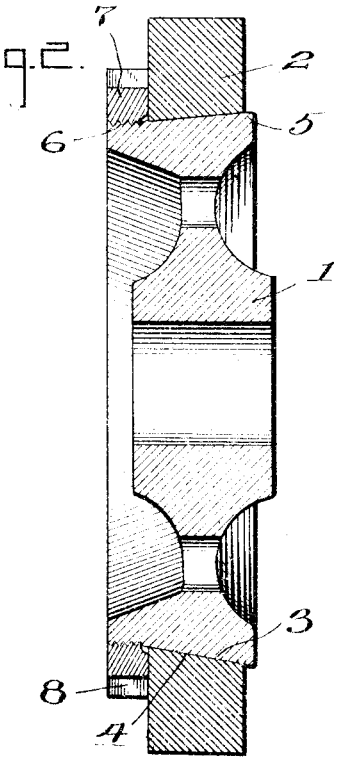

UNITED STATES PATENT OFFICE.

GUSTAV E. STOKKE, OF ROSE LAKE, IDAHO.

WHEEL FOR SAWMILL-CARRIAGE TRUCKS.

1,183,691.  Specification of Letters Patent.  Patented May 16, 1916.

Application filed January 6, 1916. Serial No. 70,680.

*To all whom it may concern:*

Be it known that I, GUSTAV E. STOKKE, a subject of the King of Norway, residing at Rose Lake, in the county of Kootenai and State of Idaho, have invented certain new and useful Improvements in Wheels for Sawmill-Carriage Trucks, of which the following is a specification.

My invention relates to an improvement in wheels for saw-mill carriage-trucks. It is designed to overcome the objection due to excessive wear of one of the two wheels, namely the flat wheel, which usually wears down at the rate of anywhere from three-eighths to five-eighths of an inch per year as compared with the wear of the V-wheel, which is in the neighborhood of one-sixteenth of an inch per year.

The object of my present invention, therefore, is to provide extra replaceable tires for the flat wheel, such as could be carried on hand and easily substituted for a worn tire, thus greatly lengthening the life of the wheel and at the same time avoiding the turning down of the V-wheel periodically to correspond with the size of the flat wheel, thus in short greatly prolonging the life of both the flat and V-wheels.

In the accompanying drawings: Figure 1 is a view in perspective of an axle showing two truck-wheels, one the so-called flat wheel, and the other the V-wheel; and Fig. 2 is an enlarged sectional view through my improved wheel, having a removable and replaceable tire.

The numeral 1 represents the wheel-hub, and 2 is the removable tire or rim. The periphery 3 of the wheel-center 1 is tapered, and the bore 4 of the tire tapers correspondingly. The length of the wheel-center is greater than the thickness of the tire, and one end 5 is larger than the corresponding end of the bore of the tire, so that the wheel-center will not pull through the tire. The opposite end of the wheel-center has screw-threads 6. A lock-nut 7 screws upon these threads, and is provided with notches 8 at the outer edge to receive a spanner, by which it is screwed tightly in place, thus making a solid wheel when screwed in place, consisting of the hub, wheel-center, tire and lock nut. In this way, it is repeated, the main portion of the wheel may be used over and over again since practically all the wear is upon the tire, which tire is by this invention renewable and replaceable. When the lock-nut is screwed up tight, the wheel-center and tire are forced together on the taper from the tapering contacting surfaces, so that they are made perfectly tight, and as if in a single piece.

I claim:

A truck-wheel for saw-mill carriages, comprising a wheel-center having a tapering periphery threaded at one end, and a removable tire having a correspondingly tapered bore which fits the taper of the wheel-center, and a threaded lock-nut which screws on the threads of the wheel-center and engages the face of the tire, whereby to force the wheel-center and tire into intimate frictional contact, forming a solid and rigid wheel.

In testimony whereof I affix my signature.

GUSTAV E. STOKKE.